United States Patent
Murakami et al.

(10) Patent No.: US 9,234,053 B2
(45) Date of Patent: Jan. 12, 2016

(54) PROCESS FOR PRODUCING CARBOXYL-CONTAINING POLYMER COMPOSITION, AND CARBOXYL-CONTAINING POLYMER COMPOSITION

(75) Inventors: Ryousuke Murakami, Hyogo (JP); Yuichiro Morimitsu, Hyogo (JP); Shinichi Takemori, Hyogo (JP); Masahiro Suzuki, Hyogo (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 0 days.

(21) Appl. No.: 13/813,357

(22) PCT Filed: Aug. 5, 2011

(86) PCT No.: PCT/JP2011/067989
§ 371 (c)(1), (2), (4) Date: Jan. 30, 2013

(87) PCT Pub. No.: WO2012/023449
PCT Pub. Date: Feb. 23, 2012

(65) Prior Publication Data
US 2013/0131299 A1    May 23, 2013

(30) Foreign Application Priority Data

Aug. 18, 2010   (JP) .................................. 2010-183501

(51) Int. Cl.
| | | |
|---|---|---|
| *C08K 5/103* | (2006.01) | |
| *C08L 33/02* | (2006.01) | |
| *C08F 2/44* | (2006.01) | |
| *C08F 220/18* | (2006.01) | |
| *C08L 33/08* | (2006.01) | |

(52) U.S. Cl.
CPC ................. *C08F 2/44* (2013.01); *C08F 220/18* (2013.01); *C08K 5/103* (2013.01); *C08L 33/08* (2013.01); *C08F 2220/1891* (2013.01)

(58) Field of Classification Search
CPC ......... C08K 5/103; C08L 33/02; C08F 20/04; C08F 20/06
USPC ............................... 524/315, 318; 526/317.1
See application file for complete search history.

(56) References Cited

U.S. PATENT DOCUMENTS

| | | | |
|---|---|---|---|
| 4,375,533 A | 3/1983 | Park et al. | |
| 4,419,502 A | 12/1983 | Sehm | |
| 4,420,596 A | 12/1983 | Lochhead et al. | |
| 5,180,798 A | 1/1993 | Nakamura et al. | |
| 5,416,158 A | 5/1995 | Santhanam et al. | |
| 6,528,575 B1 | 3/2003 | Schade et al. | |
| 6,869,994 B1 * | 3/2005 | Fujikake et al. | ............... 524/317 |
| 2011/0150796 A1 | 6/2011 | Kim et al. | |

FOREIGN PATENT DOCUMENTS

| | | |
|---|---|---|
| CN | 1053796 A | 8/1991 |
| DE | 43 25 158 A1 | 2/1995 |
| EP | 0 349 240 A2 | 1/1990 |
| EP | 0 349 241 A2 | 1/1990 |
| EP | 1 209 198 A1 | 5/2002 |
| JP | 58-17102 A | 2/1983 |
| JP | 59-81314 A | 5/1984 |
| JP | 4211408 A | 8/1992 |
| JP | 2000355614 A | 12/2000 |
| WO | WO-2010/026178 A2 | 3/2010 |

OTHER PUBLICATIONS

International Search Report PCT/ISA/210 for International Application No. PCT/JP2011/067989 dated Aug. 18, 2011.
International Preliminary Report on Patentability issued in PCT/JP2011/067989 dated Mar. 28, 2013 with full English Translation.
Hasse, K.D. (1988) "Use of isostearic acid and derivatives thereof in cosmetics", China Academic Journal Electronic Publishing House, 4:51-53—With English Translation.
Extended European Search Report dated Dec. 23, 2014 issued in European Patent Application No. 11818091.8.
Chinese Office Action Dated 12 Feb. 2015 Issued in Chinese Patent Application No. 201180036522.1—with English Translation.
Office Action dated Oct. 20, 2015 issued in Japanese Patent Application No. 2012-529567—with English Translation.

* cited by examiner

*Primary Examiner* — Vu A Nguyen
(74) *Attorney, Agent, or Firm* — Leanne M. Rakers

(57) ABSTRACT

A process is disclosed for producing a carboxyl-containing polymer composition that allows the possibility of obtaining a carboxyl-containing polymer composition which exhibits excellent dispersibility in water or the like, has a viscosity increasing to a lower degree compared to the viscosity of a neutralized viscous liquid using an additive-free carboxyl-containing polymer, and has a high degree of transparency in a neutralized viscous liquid thereof. A carboxyl-containing polymer composition is obtained by polymerizing a monomer containing an α,β-unsaturated carboxylic acid as a main component in a presence of a polyol (iso)stearic acid ester. A polyol in the polyol (iso)stearic acid ester is a polyol selected from a specific group, and the polyol (iso)stearic acid ester is used in the polymerization in an amount of 0.2 to 7 parts by mass based on 100 parts by mass of the α,β-unsaturated carboxylic acid.

6 Claims, No Drawings

PROCESS FOR PRODUCING CARBOXYL-CONTAINING POLYMER COMPOSITION, AND CARBOXYL-CONTAINING POLYMER COMPOSITION

TECHNICAL FIELD

The present invention relates to a process for producing a carboxyl-containing polymer composition and a carboxyl-containing polymer composition.

BACKGROUND ART

A carboxyl-containing polymer is used as a thickener for cosmetics and the like, a moisturizer of cataplasms and the like, an emulsifier, a suspension stabilizer of suspensions and the like, a gel base of batteries, and the like.

When the carboxyl-containing polymer is used for the above purposes, for example, the carboxyl-containing polymer is added to water or the like to prepare a homogenous dispersion, followed by neutralization by using an alkali, and the resultant is dissolved for use. However, since the carboxyl-containing polymer is generally fine powder, when the polymer is dispersed in water or the like, lumps (undissolved lumps) are easily formed. Once the undissolved lumps are generated, a gel-like layer is formed on the surface of the undissolved lump. Accordingly, the speed of water permeating to the inside of the undissolved lump becomes slow, which makes it difficult to obtain a homogenous dispersion.

In view of preventing the generation of undissolved lumps, for example, it is known that when an $\alpha,\beta$-unsaturated carboxylic acid or the like is polymerized to produce a carboxyl-containing polymer, at least one of compound among polyol fatty acid esters and polyol fatty acid ester alkylene oxide adducts is added in a specific amount to perform polymerization, whereby a carboxyl-containing polymer composition showing excellent dispersibility in water is obtained (see Patent Literature 1).

CITATION LIST

Patent Literature

[Patent Literature 1] Japanese Unexamined Patent Publication JP-A 2000-355614

SUMMARY OF INVENTION

Technical Problem

However, though the carboxyl-containing polymer composition disclosed in Patent Literature 1 shows excellent dispersibility in water or the like, the viscosity of a neutralized viscous liquid using the carboxyl-containing polymer composition is extremely high, compared to the viscosity of a neutralized viscous liquid using an additive-free carboxyl-containing polymer to which at least one of compound among polyol fatty acid esters and polyol fatty acid ester alkylene oxide adducts is not added. Accordingly, for example, when the concentration of the carboxyl-containing polymer composition in the neutralized viscous liquid is increased or decreased, the viscosity changes sharply, and thereby it is found there are problems that the viscosity of products such as cosmetics is not easily controlled, and the texture of products becomes unsatisfactory. In addition, it is also found there is a problem that the transparency of the neutralized viscous liquid using the carboxyl-containing polymer composition is low, and the like.

In this respect, an object of the invention is to provide a process for producing a carboxyl-containing polymer composition that allows the possibility of obtaining a carboxyl-containing polymer composition which exhibits excellent dispersibility in water or the like, has a viscosity increasing to a lower degree compared to the viscosity of a neutralized viscous liquid using an additive-free carboxyl-containing polymer, and has a high degree of transparency in a neutralized viscous liquid thereof.

Solution to Problem

The invention provides a process for producing a carboxyl-containing polymer composition including polymerizing a monomer containing an $\alpha,\beta$-unsaturated carboxylic acid as a main component in a presence of a polyol (iso)stearic acid ester, the polyol (iso)stearic acid ester having one to five hydroxyl groups derived from a polyol in the polyol (iso)stearic acid ester molecule, the polyol in the polyol (iso)stearic acid ester being at least one of polyol selected from a group consisting of monoglycerin, diglycerin, triglycerin, tetraglycerin, pentaglycerin, hexaglycerin, heptaglycerin, octaglycerin, nonaglycerin, decaglycerin, sorbit, and sorbitan, and an amount of the polyol (iso)stearic acid ester used being 0.2 to 7 parts by mass based on 100 parts by mass of the $\alpha,\beta$-unsaturated carboxylic acid.

In the process for producing a carboxyl-containing polymer composition of the invention, it is preferable that the polyol (iso)stearic acid ester is at least one selected from a group consisting of monoglyceryl mono(iso)stearate, diglyceryl mono(iso)stearate, monoglyceryl di(iso)stearate, diglyceryl di(iso)stearate, triglyceryl di(iso)stearate, diglyceryl tri(iso)stearate, triglyceryl tri(iso)stearate, tetraglyceryl tri(iso)stearate, triglyceryl tetra(iso)stearate, tetraglyceryl tetra(iso)stearate, and pentaglyceryl tetra(iso)stearate.

In the process for producing a carboxyl-containing polymer composition of the invention, it is preferable that the monomer containing an $\alpha,\beta$-unsaturated carboxylic acid as a main component contains a compound having two or more ethylenically unsaturated groups.

In the process for producing a carboxyl-containing polymer composition of the invention, it is preferable that the compound having two or more ethylenically unsaturated groups is at least one selected from a group consisting of pentaerythirol diallyl ether, pentaerythritol triallyl ether, pentaerythritol tetraallyl ether, tetraallyloxyethane, triallyl phosphate, and polyallyl saccharose.

In addition, the invention provides a carboxyl-containing polymer composition obtained by the process for producing a carboxyl-containing polymer composition mentioned above.

Advantageous Effects of Invention

According to the invention, the process for producing a carboxyl-containing polymer composition is a process for producing a carboxyl-containing polymer composition including polymerizing a monomer containing an $\alpha,\beta$-unsaturated carboxylic acid as a main component in the presence of a polyol (iso)stearic acid ester. In addition, the polyol (iso)stearic acid ester has one to five hydroxyl groups derived from a polyol in a molecule, the polyol is at least one selected from a group consisting of monoglycerin, diglycerin, triglycerin, tetraglycerin, pentaglycerin, hexaglycerin, heptaglycerin, octaglycerin, nonaglycerin, decaglycerin, sorbitol, and sorbitan, and the amount of the polyol (iso)stearic acid ester used at the time of polymerization is 0.2 to 7 parts by mass based on 100 parts by mass of the $\alpha,\beta$-unsaturated carboxylic acid.

By the process, it is possible to obtain a carboxyl-containing polymer composition which exhibits excellent dispersibility in water or the like, has a viscosity increasing to a lower degree compared to the viscosity of a neutralized viscous liquid using an additive-free carboxyl-containing polymer, and has a high degree of transparency in a neutralized viscous liquid thereof.

DESCRIPTION OF EMBODIMENTS

In the process for producing a carboxyl-containing polymer composition according to the invention, the monomer containing an $\alpha,\beta$-unsaturated carboxylic acid as a main component is polymerized in the presence of a specific polyol (iso)stearic acid ester.

The $\alpha,\beta$-unsaturated carboxylic acid is not particularly limited, and examples thereof include olefin-based unsaturated carboxylic acids having 3 to 5 carbon atoms, such as acrylic acid, methacrylic acid, crotonic acid, maleic acid, itaconic acid, and fumaric acid. Among these $\alpha,\beta$-unsaturated carboxylic acids, acrylic acid and methacrylic acid are suitably used in the respects that these are cheap and easily obtained, and that the transparency of an aqueous solution using the obtained carboxyl-containing polymer composition is high. In addition, each of these $\alpha,\beta$-unsaturated carboxylic acids may be used alone, or two or more thereof may be used in combination.

To the monomer containing the $\alpha,\beta$-unsaturated carboxylic acid as a main component, a compound having two or more ethylenically unsaturated groups, an $\alpha,\beta$-unsaturated compound, and the like can be added, in view of adjusting the viscosity of a neutralized viscous liquid using the obtained carboxyl-containing polymer composition.

Moreover, in the specification, a neutralized viscous liquid refers to a solution which is obtained by dispersing the carboxyl-containing polymer composition in water and then adjusting a pH thereof to about pH 7 (pH=6 to 8) by using a neutralizer such as an alkaline compound.

The compound having two or more ethylenically unsaturated groups is not particularly limited, and examples thereof include acrylic acid esters of polyols substituted with two or more substituents; methacrylic acid esters of polyols substituted with two or more substituents; allyl ethers of polyols substituted with two or more substituents; diallyl phthalate, triallyl phosphate, allyl methacrylate, tetraallyloxyethane, triallyl cyanurate, divinyl adipate, vinyl crotonate, 1,5-hexadiene, and divinyl benzene. In addition, examples of the polyol include ethylene glycol, propylene glycol, polyoxyethylene glycol, polyoxypropylene glycol, glycerin, polyglycerin, trimethylolpropane, pentaerythritol, saccharose, and sorbitol. Among these compounds having two or more ethylenically unsaturated groups, in the respect that the viscosity of a neutralized viscous liquid using the obtained carboxyl-containing polymer composition is easily adjusted, pentaerythritol diallyl ether, pentaerythritol triallyl ether, pentaerythritol tetraallyl ether, tetraallyloxyethane, triallyl phosphate, and polyallyl saccharose are suitable used. Moreover, each of these compounds having two or more ethylenically unsaturated groups may be used alone, or two or more thereof may be used in combination.

The amount of the compound having two or more ethylenically unsaturated groups used is preferably 0.01 to 10 parts by mass, more preferably 0.05 to 10 parts by mass, and even more preferably 0.05 to 3 parts by mass, based on 100 parts by mass of the $\alpha,\beta$-unsaturated carboxylic acid. If the amount of the compound having two or more ethylenically unsaturated groups used is less than 0.01 part by mass, there is a concern that the effect of adjusting the viscosity of the neutralized viscous liquid using the obtained carboxyl-containing polymer composition will not be produced. In addition, if the amount of the compound having two or more ethylenically unsaturated groups used exceeds 10 parts by mass, there is a concern that the obtained carboxyl-containing polymer composition will be insoluble in water.

The $\alpha,\beta$-unsaturated compound is not particularly limited as long as it is a compound excluding the $\alpha,\beta$-unsaturated carboxylic acid, and examples of the compound include acrylic acid esters such as methyl acrylate, ethyl acrylate, isopropyl acrylate, butyl acrylate, octyl acrylate, 2-ethyl acrylate, decyl acrylate, lauroyl acrylate, stearyl acrylate, and glycidyl acrylate; methacrylic acid esters corresponding to the above acrylic acid esters; glycidyl ethers such as vinyl glycidyl ether, isopropenyl glycidyl ether, allyl glycidyl ether, and butenyl glycidyl ether; acrylamides such as acrylamide, N-methylacrylamide, N-ethylacrylamide, and N-t-butylacrylamide; methacrylamides corresponding to the above acrylamides; and vinyl esters such as vinyl acetate, vinyl propionate, and vinyl benzoate. Among these $\alpha,\beta$-unsaturated compounds, acrylic acid esters and methacrylic acid esters are suitably used, and particularly, stearyl methacrylate, eicosanyl methacrylate, behenyl methacrylate, and tetracosanyl methacrylate are suitably used. Each of these $\alpha,\beta$-unsaturated compounds may be used alone, or two or more thereof may be used in combination. In addition, as the acrylic acid esters and the methacrylic acid esters, for example, commercially available products such as a product having a trade name of BLEMMER VMA70 manufactured by NOF CORPORATION may be used.

The amount of the $\alpha,\beta$-unsaturated compound used is preferably 0.1 to 20 parts by mass, and more preferably 1 to 10 parts by mass, based on 100 parts by mass of the $\alpha,\beta$-unsaturated carboxylic acid. If the amount of the $\alpha,\beta$-unsaturated compound used is less than 0.1 part by mass, there is a concern that the effect of adjusting viscosity of the neutralized viscous liquid using the obtained carboxyl-containing polymer composition will not be produced. In addition, if the amount of the $\alpha,\beta$-unsaturated compound used exceeds 20 parts by mass, there is a concern that the viscosity of the neutralized viscous liquid using the obtained carboxyl-containing polymer composition will be lowered.

The polyol (iso)stearic acid ester used in the process for producing a carboxyl-containing polymer composition according to the invention is a compound having a specific structure. Moreover, in the specification, an (iso)stearic acid refers to both the stearic acid and isostearic acid.

The polyol of the polyol (iso)stearic acid ester is at least one of polyol selected from a group consisting of monoglycerin, diglycerin, triglycerin, tetraglycerin, pentaglycerin, hexaglycerin, heptaglycerin, octaglycerin, nonaglycerin, decaglycerin, sorbit, and sorbitan.

The polyol (iso)stearic acid ester is a compound having one to five hydroxyl groups derived from polyol in the polyol (iso)stearic acid ester molecule, and is preferably a compound having one to three hydroxyl groups described above. When the compound does not have a hydroxyl group (0 hydroxyl groups), dispersibility of the obtained carboxyl-containing polymer composition in water worsens. Moreover, when the compound has 6 or more hydroxyl groups, the viscosity of the neutralized viscous liquid using the obtained carboxyl-containing polymer composition becomes too high, and the transparency of the aqueous solution using the obtained carboxyl-containing polymer composition is lowered.

Herein, the dispersibility of the carboxyl-containing polymer composition in water can be judged by the state of undissolved lumps formed when the carboxyl-containing polymer composition is put in water. If the carboxyl-containing polymer composition put in water becomes a transparent gel, and the time required for the composition to disperse without forming undissolved lumps is within a predetermined time, the carboxyl-containing polymer composition can be judged to have excellent dispersibility in water.

Moreover, the viscosity of the neutralized viscous liquid is measured using a B-type rotational viscometer under a condition of a temperature of 25° C. In the invention, if the viscosity of the neutralized viscous liquid is equal to or less than 2.5 times the viscosity of a neutralized viscous liquid using an additive-free carboxyl-containing polymer (not containing polyol (iso)stearic acid ester), it is possible to judge that the viscosity increase is caused to a low degree. If the viscosity increase of the neutralized viscous liquid exceeds 2.5 times, for example, when the concentration of the carboxyl-containing polymer composition in the neutralized viscous liquid is increased or decreased, the viscosity changes sharply, which leads to a concern that problems that the viscosity of products such as cosmetics will not be easily controlled, and the texture of a product becomes unsatisfactory will arise.

The transparency of the neutralized viscous liquid can be judged by a transmittance of light having a wavelength of 425 nm measured using a spectrophotometer. A neutralized viscous liquid having a transmittance of 90% or more can be judged to be a neutralized viscous liquid having a high degree of transparency. If the transmittance of a neutralized viscous liquid is less than 90%, for example, there is a concern that a problem that appearance (designability) worsens when the liquid is used for cosmetics and the like will arise.

Specific examples of the polyol stearic acid ester having a specific structure include monoglyceryl monostearate, diglyceryl monostearate, triglyceryl monostearate, tetraglyceryl monostearate, sorbit monostearate, sorbitan monostearate, monoglyceryl distearate, diglyceryl distearate, triglyceryl distearate, tetraglyceryl distearate, pentaglyceryl distearate, sorbit distearate, sorbitan distearate, diglyceryl tristearate, triglyceryl tristearate, tetraglyceryl tristearate, pentaglyceryl tristearate, hexaglyceryl tristearate, sorbit tristearate, sorbitan tristearate, triglyceryl tetrastearate, tetraglyceryl tetrastearate, pentaglyceryl tetrastearate, hexaglyceryl tetrastearate, heptaglyceryl tetrastearate, sorbit tetrastearate, tetraglyceryl pentastearate, pentaglyceryl pentastearate, hexaglyceryl pentastearate, heptaglyceryl pentastearate, octaglyceryl pentastearate, sorbit pentastearate, pentaglyceryl hexastearate, hexaglyceryl hexastearate, heptaglyceryl hexastearate, octaglyceryl hexastearate, nonaglyceryl hexastearate, hexaglyceryl heptastearate, heptaglyceryl heptastearate, octaglyceryl heptastearate, nonaglyceryl heptastearate, decaglyceryl heptastearate, heptaglyceryl octastearate, octaglyceryl octastearate, nonaglyceryl octastearate, decaglyceryl octastearate, ocatglyceryl nonastearate, nonaglyceryl nonastearate, decaglyceryl nonastearate, nonaglyceryl decastearate, and decaglyceryl decastearate.

Among these polyol stearic acid esters, in the respect that the obtained carboxyl-containing polymer composition exhibits excellent dispersibility in water or the like, has a viscosity increasing to a lower degree compared to the viscosity of a neutralized viscous liquid using an additive-free carboxyl-containing polymer, and has a high degree of transparency in a neutralized viscous liquid thereof, the followings are suitably used: monoglyceryl monostearate, diglyceryl monostearate, sorbitan monostearate, monoglyceryl distearate, diglyceryl distearate, triglyceryl distearate, sorbitan distearate, diglyceryl tristearate, triglyceryl tristearate, tetraglyceryl tristearate, sorbit tristearate, sorbitan tristearate, triglyceryl tetrastearate, tetraglyceryl tetrastearate, pentaglyceryl tetrastearate, sorbit tetrastearate, tetraglyceryl pentastearate, pentaglyceryl pentastearate, hexaglyceryl pentastearate, sorbit pentastearate, pentaglyceryl hexastearate, hexaglyceryl hexastearate, heptaglyceryl hexastearate, hexaglyceryl heptastearate, heptaglyceryl heptastearate, octaglyceryl heptastearate, heptaglyceryl octastearate, octaglyceryl octastearate, nonaglyceryl octastearate, octaglyceryl nonastearate, nonaglyceryl nonastearate, decaglyceryl nonastearate, nonaglyceryl decastearate, and decaglyceryl decastearate.

In addition, as the polyol stearic acid ester, in the respect that even if a small amount of the polyol stearic acid ester is used, the obtained carboxyl-containing polymer composition exhibits excellent dispersibility in water or the like, has a viscosity increasing to a lower degree compared to the viscosity of a neutralized viscous liquid using an additive-free carboxyl-containing polymer, and has a high degree of transparency in a neutralized viscous liquid thereof, monoglyceryl monostearate, diglyceryl monostearate, monoglyceryl distearate, diglyceryl distearate, triglyceryl distearate, diglyceryl tristearate, triglyceryl tristearate, tetraglyceryl tristearate, triglyceryl tetrastearate, tetraglyceryl tetrastearate, and pentaglyceryl tetrastearate are more suitably used. Each of these polyol stearic acid esters may be used alone, or two or more thereof may be used in combination.

Specific examples of the polyol isostearic acid ester having a specific structure include monoglyceryl monoisostearate, diglyceryl monoisostearate, triglyceryl monoisostearate, tetraglyceryl monoisostearate, sorbit monoisostearate, sorbitan monoisostearate, monoglyceryl diisostearate, diglyceryl diisostearate, triglyceryl diisostearate, tetraglyceryl diisostearate, pentaglyceryl diisostearate, sorbit diisostearate, sorbitan diisostearate, diglyceryl triisostearate, triglyceryl triisostearate, tetraglyceryl triisostearate, pentaglyceryl triisostearate, hexaglyceryl triisostearate, sorbit triisostearate, sorbitan triisostearate, triglyceryl tetraisostearate, tetraglyceryl tetraisostearate, pentaglyceryl tetraisostearate, hexaglyceryl tetraisostearate, heptaglyceryl tetraisostearate, sorbit tetraisostearate, tetraglyceryl pentaisostearate, pentaglyceryl pentaisostearate, hexaglyceryl pentaisostearate, heptaglyceryl pentaisostearate, octaglyceryl pentaisostearate, sorbit pentaisostearate, pentaglyceryl hexaisostearate, hexaglyceryl hexaisostearate, heptaglyceryl hexaisostearate, octaglyceryl hexaisostearate, nonaglyceryl hexaisostearate, hexaglyceryl heptaisostearate, heptaglyceryl heptaisostearate, octaglyceryl heptaisostearate, nonaglyceryl heptaisostearate, decaglyceryl heptaisostearate, heptaglyceryl octaisostearate, octaglyceryl octaisostearate, nonaglyceryl octaisostearate, decaglyceryl octaisostearate, ocatglyceryl nonaisostearate, nonaglyceryl nonaisostearate, decaglyceryl nonaisostearate, nonaglyceryl decaisostearate, and decaglyceryl decaisostearate.

Among these polyol isostearic acid esters, in the respect that the obtained carboxyl-containing polymer composition exhibits excellent dispersibility in water or the like, has a viscosity increasing to a lower degree compared to the viscosity of a neutralized viscous liquid using an additive-free carboxyl-containing polymer, and has a high degree of transparency in a neutralized viscous liquid thereof, the followings are suitably used: monoglyceryl monoisostearate, diglyceryl monoisostearate, sorbitan monoisostearate, monoglyceryl diisostearate, diglyceryl diisostearate, triglyceryl diisostearate, sorbitan diisostearate, diglyceryl triisostearate, triglyceryl triisostearate, tetraglyceryl triisostearate, sorbit triisostearate, sorbitan triisostearate, triglyceryl tetraisostearate, tetraglyceryl tetraisostearate, pentaglyceryl tetraisostearate, sorbit tetraisostearate, tetraglyceryl pentaisostearate, pentaglyceryl pentaisostearate, hexaglyceryl pentaisostearate, sorbit pentaisostearate, pentaglyceryl hexaisostearate, hexaglyceryl hexaisostearate, heptaglyceryl hexaisostearate, hexaglyceryl heptaisostearate, heptaglyceryl heptaisostearate, octaglyceryl heptaisostearate, heptaglyceryl octaisostearate, octaglyceryl octaisostearate, nonaglyceryl octaisostearate, octaglyceryl nonaisostearate, nonaglyceryl nonaisostearate, decaglyceryl nonaisostearate, nonaglyceryl decaisostearate, and decaglyceryl decaisostearate.

In addition, as the polyol isostearic acid ester, in the respect that even if a small amount of the polyol isostearic acid ester is used, the obtained carboxyl-containing polymer composition exhibits excellent dispersibility in water or the like, has a viscosity increasing to a lower degree compared to the viscosity of a neutralized viscous liquid using an additive-free carboxyl-containing polymer, and has a high degree of transparency in a neutralized viscous liquid thereof, monoglyceryl monoisostearate, diglyceryl monoisostearate, monoglyceryl diisostearate, diglyceryl diisostearate, triglyceryl diisostearate, diglyceryl triisostearate, triglyceryl triisostearate, tetraglyceryl triisostearate, triglyceryl tetraisostearate, tetraglyceryl tetraisostearate, and pentaglyceryl tetraisostearate are more suitably used. Each of these polyol isostearic acid esters may be used alone, or two or more thereof may be used in combination.

The amount of the polyol (iso)stearic acid ester used is 0.2 to 7 parts by mass, and preferably 0.3 to 6 parts by mass, based on 100 parts by mass of the α,β-unsaturated carboxylic acid. If the amount of the polyol (iso)stearic acid ester used is less than 0.2 part by mass, the dispersibility of the obtained carboxyl-containing polymer composition in water worsens. If the amount of the polyol (iso)stearic acid ester used exceeds 7 parts by mass, the effect of adjusting the viscosity of the neutralized viscous liquid using the obtained carboxyl-containing polymer composition is not produced.

In the process for producing a carboxyl-containing polymer composition according to the invention, as the method of polymerizing the monomer containing the α,β-unsaturated carboxylic acid as a main component in the presence of the polyol (iso)stearic acid ester, the followings are exemplified: for example, (1) a method of adding the polyol (iso)stearic acid ester to the monomer containing the α,β-unsaturated carboxylic acid as a main component and performing polymerization, (2) a method of adding the polyol (iso)stearic acid ester into a system where the monomer containing the α,β-unsaturated carboxylic acid as a main component is being polymerized, (3) a method of performing polymerization while adding the monomer containing the α,β-unsaturated carboxylic acid as a main component into a system where the polyol (iso)stearic acid ester is present, and the like. Among these methods, in view of simplicity of operation, the method in which the polyol (iso)stearic acid ester is caused to coexist with the monomer containing the α,β-unsaturated carboxylic acid as a main component from the initial stage of polymerization when the monomer is polymerized is suitably used.

Hereinafter, the method of adding the polyol (iso)stearic acid ester to the monomer containing the α,β-unsaturated carboxylic acid as a main component and performing polymerization will be described in detail. More specifically, for example, a method of polymerizing the monomer containing the α,β-unsaturated carboxylic acid as a main component in the presence of the polyol (iso)stearic acid ester, in a reaction solvent by using a radical polymerization initiator is exemplified.

The reaction solvent is not particularly limited. However, the reaction solvent is preferably a solvent which dissolves the monomer containing the α,β-unsaturated carboxylic acid as a main component but does not dissolve the obtained carboxyl-containing polymer composition. Examples of the reaction solvent include aliphatic hydrocarbons such as n-pentane, n-hexane, isohexane, n-heptane, n-octane, and isooctane; alicyclic hydrocarbons such as cyclopentane, methyl cyclopentane, cyclohexane, and methyl cyclohexane; aromatic hydrocarbons such as benzene, toluene, and xylene; halogenated compounds such as chlorobenzene and ethylene dichloride; acetic acid alkyl esters such as ethyl acetate and isopropyl acetate; and ketone compounds such as methyl ethyl ketone and methyl isobutyl ketone. Among these reaction solvents, in view of stabilized quality and ease of availability, n-hexane, cyclohexane, n-heptane, ethylene dichloride, and ethyl acetate are suitably used. Each of these reaction solvents may be used alone, or two or more thereof may be used in combination.

The amount of the reaction solvent used is preferably 200 to 10000 parts by mass, and more preferably 300 to 2000 parts by mass, based on 100 parts by mass of the α,β-unsaturated carboxylic acid. If the amount of the reaction solvent used is less than 200 parts by mass, there is a concern that since the carboxyl-containing polymer composition will be precipitated easily as the polymerization reaction proceeds, it will be difficult to evenly stir the reaction system, and as a result, it will be difficult to control the reaction. If the amount of the reaction solvent used exceeds 10000 parts by mass, there is a possibility that economic efficiency will deteriorate since the amount of the carboxyl-containing polymer composition prepared per unit polymerization is small.

The radical polymerization initiator is not particularly limited, and examples thereof include α,α'-azobisisobutyronitrile, 2,2'-azobis-2,4-dimethylvaleronitrile, 2,2'-azobismethylisobutyrate, benzoyl peroxide, lauroyl peroxide, cumene hydroperoxide, and tert-butyl hydroperoxide. Each of these radical polymerization initiators may be used alone, or two or more thereof may be used in combination.

The amount of the radical polymerization initiator used is preferably 0.01 to 0.45 part by mass, and more preferably 0.01 to 0.35 part by mass, based on 100 parts by mass of the α,β-unsaturated carboxylic acid. If the amount of the radical polymerization initiator used is less than 0.01 part by mass, the polymerization reaction rate becomes slow, so it is difficult to economically prepare a desired carboxyl-containing polymer composition. If the amount of the radical polymerization initiator used exceeds 0.45 part by mass, there is a concern that the polymerization reaction rate will increase too much, so it will be difficult to control the reaction.

The atmosphere of the polymerization reaction system is preferably an atmosphere of inert gas such as nitrogen gas or argon gas in general. In view of facilitating control of the reaction by inhibiting viscosity increase of the reaction solution, and in view of controlling the bulk density of the obtained carboxyl-containing polymer composition, the reaction temperature at the time of polymerization is preferably set to 50 to 90° C., and more preferably set to 55 to 80° C. The reaction time for polymerization cannot be uniformly determined since it depends on the reaction temperature, but is generally 0.5 to 10 hours. Generally, after the reaction ends, if the reaction solution is heated at 80 to 120° C. to remove the solvent, a desired carboxyl-containing polymer composition can be isolated as fine white powder-like substance.

The carboxyl-containing polymer composition obtained by the process for producing a carboxyl-containing polymer composition according to the invention has characteristics of exhibiting excellent dispersibility in water or the like, having a viscosity increasing to a lower degree compared to the viscosity of a neutralized viscous liquid using an additive-free carboxyl-containing polymer, and having a high degree of transparency in a neutralized viscous liquid thereof.

The mechanism showing an action that causes the composition to exhibit excellent dispersibility in water or the like has not been clarified. However, presumably, since the carboxyl group in the α,β-unsaturated carboxylic acid molecule and an ether group or a hydroxyl group in the polyol (iso)stearic acid ester molecule may form an aggregate, and a hydrophobic portion in the adjacent polyol (iso)stearic acid ester molecule may partially hydrophobize the carboxyl-containing polymer, the initial hydration of the carboxyl-containing polymer may be inhibited, and as a result, excellent dispersibility in which, for example, undissolved lumps are not easily formed may be realized.

In addition, the mechanism showing the phenomenon that the viscosity increases to a lower degree compared to the viscosity of a neutralized viscous liquid using an additive-free carboxyl-containing polymer has not been clarified. However, presumably, by using a specific polyol (iso)stearic acid ester, that is, by using a compound in which (1) a fatty acid portion of the polyol (iso)stearic acid ester is (iso)stearic acid, (2) a polyol portion of the polyol (iso)stearic acid ester is at least one of polyol selected from a group consisting of monoglycerin, diglycerin, triglycerin, tetraglycerin, pentaglycerin, hexaglycerin, heptaglycerin, octaglycerin, nonaglycerin, decaglycerin, sorbit, and sorbitan, and (3) the polyol (iso)stearic acid ester molecule contains one to five hydroxyl groups derived from a polyol, the hydroxyl group in the polyol (iso)stearic acid ester molecule may appropriately form a three dimensional structure with the carboxyl-containing polymer by an ester bond, a hydrogen bond, an ionic bond, or the like, and as a result, the viscosity increase of the obtained neutralized viscous liquid may be suppressed to be low.

In addition, the mechanism showing the action by which the transparency of the neutralized viscous liquid is heightened has not been clarified. However, presumably, the specific polyol (iso)stearic acid ester may have excellent affinity with the carboxyl-containing polymer, and as a result, the transparency of the neutralized viscous liquid may be heightened.

Hereinafter, the invention will be described in more detail based on examples and comparative examples, but the invention is not limited to the examples.

[Evaluation Method]

Carboxyl-containing polymer compositions obtained in examples and comparative examples were measured and evaluated in the following manner.

(1) Dispersion Time Under Non-Stirring

In a beaker having a volume of 500 mL (milliliters) 298.5 g of deionized water is put, and the temperature of the deionized water is adjusted to 25° C. Into the beaker 1.5 g of the carboxyl-containing polymer composition is put at a time under a non-stirring condition, and the dispersed state of the carboxyl-containing polymer composition is visually observed, whereby the time (min) required for the carboxyl-containing polymer composition to thoroughly disperse without forming undissolved lumps is measured. If the time required for dispersion is 15 minutes or shorter, it is possible to judge the dispersibility as being excellent. In addition, when the composition does not disperse and undissolved lumps are formed even after 60 minutes, the dispersion time was evaluated to be "60<".

(2) Dispersion Time Under Stirring

In a beaker having a volume of 500 mL (milliliters) 298.5 g of deionized water is put, and the temperature of the deionized water is adjusted to 25° C. While the beaker is being stirred at a rotation rate of 300 r/min by using a stirrer provided with a 4-blade bottle (blade diameter: 50 mm), 1.5 g of the carboxyl-containing polymer composition is put into the beaker at a time, and the dispersed state of the carboxyl-containing polymer composition is visually observed, whereby the time required for the carboxyl-containing polymer composition to thoroughly disperse without forming undissolved lumps is measured. If the time required for dispersion is 10 minutes or shorter, it is possible to judge the dispersibility as being excellent. In addition, when the composition does not disperse and undissolved lumps are formed even after 60 minutes, the dispersion time was evaluated to be "60<".

(3) Viscosity of Neutralized Viscous Liquid

The dispersion obtained by the evaluation of (2) Dispersion time under stirring was neutralized to yield pH=7 by using 0.5% by mass aqueous sodium hydroxide solution, thereby preparing a neutralized viscous liquid for evaluation. The obtained neutralized viscous liquid for evaluation was measured in terms of a viscosity after 60 seconds, by using a B-type rotational viscometer under conditions of a rotor No. 7, 20 rpm, and a temperature of 25° C. If the ratio of viscosity of a dispersion to Comparative Example 1 is in a range of 2.5 times or less, the viscosity can be judged to be appropriate.

(4) Transmittance of Neutralized Viscous Liquid

The neutralized viscous liquid for evaluation obtained by the same method as in the evaluation of (3) Viscosity of neutralized viscous liquid was measured in terms of a transmittance of light having a wavelength: 425 nm, by using a spectrophotometer (manufactured by Shimadzu Corporation, model number: UV-3150). If the transmittance is 90% or more, it is possible to judge the transparency as being high.

Example 1

In a four-neck flask provided with a stirrer, a thermometer, a nitrogen blowing tube, and a condenser tube and having a volume of 500 mL (milliliters) there were put 45 g (0.625 mol) of acrylic acid, 0.88 g of BLEMMER-VMA70 (manufactured by NOF CORPORATION, a mixture including 10 to 20 parts by mass of stearyl methacrylate, 10 to 20 parts by mass of eicosanyl methacrylate, and 59 to 80 parts by mass of behenyl methacrylate, in which the content of tetracosanyl methacrylate was 1% by mass or less) as a (meth)acrylic acid alkyl ester in which the alkyl group had 18 to 24 carbon atoms, 0.180 g of pentaerythritol tetraallyl ether as a compound having two or more ethylenically unsaturated groups, 0.081 g (0.00035 mol) of 2,2'-azobismethylisobutyrate as a radical polymerization initiator, 160 g of n-heptane and 24 g of ethyl acetate as reaction solvents, and 0.45 g (1 part by mass based on 100 parts by mass of acrylic acid) of monoglyceryl monoisostearate (manufactured by Nikko Chemicals Co., Ltd., model number: NIKKOL MGIS, number of hydroxyl group: 2). Thereafter, the solution was stirred to be homogenous and mixed, and then nitrogen gas was blown into the solution so as to remove oxygen present in the space of the top portion of the reaction container (four-neck flask), the raw materials, and the reaction solvent. Subsequently, the solution was kept at 60 to 65° C. under a nitrogen atmosphere and reacted for 4 hours.

After the reaction ended, the generated slurry was heated at 110° C. to evaporate n-heptane and ethyl acetate, and dried for 8 hours under reduced pressure at 115° C. and 10 mmHg, thereby obtaining 43 g of a carboxyl-containing polymer composition as fine white powder.

Example 2

In the same manner as in Example 1 except that the amount of the monoglyceryl monoisostearate used was changed to 0.225 g (0.5 part by mass based on 100 parts by mass of acrylic acid) from 0.45 g in Example 1, 40 g of a carboxyl-containing polymer composition as fine white powder was obtained.

Example 3

In the same manner as in Example 1 except that the amount of the monoglyceryl monoisostearate used was changed to 2.25 g (5 parts by mass based on 100 parts by mass of acrylic acid) from 0.45 g in Example 1, 42 g of a carboxyl-containing polymer composition as fine white powder was obtained.

Example 4

In the same manner as in Example 1 except that 0.45 g of the monoglyceryl monoisostearate was changed to 0.45 g of monoglyceryl monostearate (manufactured by RIKEN VITAMIN CO., LTD., model number: Poem V-100, number of hydroxyl group: 2) in Example 1, 43 g of a carboxyl-containing polymer composition as fine white powder was obtained.

Example 5

In the same manner as in Example 1 except that 0.45 g of the monoglyceryl monoisostearate was changed to 0.45 g of monoglyceryl distearate (manufactured by Nikko Chemicals Co., Ltd., model number: NIKKOL DGO-80, number of hydroxyl group: 1) in Example 1, 43 g of a carboxyl-containing polymer composition as fine white powder was obtained.

Example 6

In the same manner as in Example 1 except that 0.45 g of the monoglyceryl monoisostearate was changed to 0.45 g of diglyceryl monoisostearate (manufactured by KOKYU ALCOHOL CO., LTD., model number: Risorex PGIS-21, number of hydroxyl groups: 3) in Example 1, 43 g of a carboxyl-containing polymer composition as fine white powder was obtained.

Comparative Example 1

In the same manner as in Example 1 except that 0.45 g of the monoglyceryl monoisostearate was not used in Example 1, 43 g of a carboxyl-containing polymer composition as fine white powder was obtained. Comparative Example 1 is an additive-free carboxyl-containing polymer that does not contains a polyol (iso)stearic acid ester.

Comparative Example 2

In the same manner as in Example 1 except that the amount of the monoglyceryl monoisostearate used was changed to 0.045 g (0.1 part by mass based on 100 parts by mass of acrylic acid) from 0.45 g in Example 1, 40 g of a carboxyl-containing polymer composition as fine white powder was obtained.

Comparative Example 3

In the same manner as in Example 1 except that the amount of the monoglyceryl monoisostearate used was changed to 3.6 g (8 parts by mass based on 100 parts by mass of acrylic acid) from 0.45 g in Example 1, 42 g of a carboxyl-containing polymer composition as fine white powder was obtained.

Comparative Example 4

In the same manner as in Example 1 except that 0.45 g of the monoglyceryl monoisostearate was changed to 0.45 g of polyoxyethylene triisostearate hydrogenated castor oil (manufactured by Nihon Emulsion Co., Ltd., model number: RWIS-360, ethylene oxide 60 mol adduct) in Example 1, 43 g of a carboxyl-containing polymer composition as fine white powder was obtained.

Comparative Example 5

In the same manner as in Example 1 except that 0.45 g of the monoglyceryl monoisostearate was changed to 0.45 g of monoglyceryl monooleate (manufactured by RIKEN VITAMIN CO., LTD., model number: Rikenol OL-100, number of hydroxyl group: 2) in Example 1, 43 g of a carboxyl-containing polymer composition as fine white powder was obtained.

Comparative Example 6

In the same manner as in Example 1 except that 0.45 g of the monoglyceryl monoisostearate was changed to 0.45 g of hexaglyceryl diisostearate (manufactured by Nihon Emulsion Co., Ltd., model number: EMALEX DISG-6, number of hydroxyl group: 6) in Example 1, 42 g of a carboxyl-containing polymer composition as fine white powder was obtained.

Comparative Example 7

In the same manner as in Example 1 except that 0.45 g of the monoglyceryl monoisostearate was changed to 0.45 g of monoglyceryl tristearate (manufactured by Wako Pure Chemical Industries, LTD., number of hydroxyl group: 0) in Example 1, 43 g of a carboxyl-containing polymer composition as fine white powder was obtained.

[Evaluation Result]

The carboxyl-containing polymer compositions of Examples 1 to 6 and Comparative Examples 1 to 7 were measured and evaluated in the manner described above. The results are shown in Table 1.

In Table 1, the amount of the polyol (iso)stearic acid ester used indicates part(s) by mass based on 100 parts by mass of the α,β-unsaturated carboxylic acid. In addition, in Table 1, the number of hydroxyl groups in the polyol (iso)stearic acid ester indicates the number of hydroxyl groups derived from a polyol in the molecule.

TABLE 1

Evaluation of carboxyl-containing polymer composition

|  | Polyol (iso)stearic acid ester | | Dispersion time | | Viscosity of neutralized viscous liquid | | Transmittance [%] |
|---|---|---|---|---|---|---|---|
|  | Type | Hydroxyl group [Number] | Used amount [Part] | Under non-stirring [Min] | Under stirring [Min] | Measured value [mPa·s] | Viscosity ratio to Comparative Example 1 [Times] |
| Example 1 | Monoglyceryl monoisostearate | 2 | 1 | 7 | 2 | 27000 | 1.8 | 97 |
| Example 2 | Monoglyceryl monoisostearate | 2 | 0.5 | 8 | 4 | 18000 | 1.2 | 98 |
| Example 3 | Monoglyceryl monoisostearate | 2 | 5 | 6 | 2 | 36000 | 2.4 | 93 |
| Example 4 | Monoglyceryl monostearate | 2 | 1 | 8 | 2 | 32000 | 2.1 | 95 |
| Example 5 | Monoglyceryl distearate | 1 | 1 | 8 | 2 | 19000 | 1.3 | 92 |
| Example 6 | Diglyceryl monoisostearate | 3 | 1 | 7 | 3 | 36000 | 2.4 | 92 |
| Comparative Example 1 | — | — | — | 60< | 60< | 15000 | — | 99 |
| Comparative Example 2 | Monoglyceryl monoisostearate | 2 | 0.1 | 42 | 28 | 16000 | 1.1 | 99 |
| Comparative Example 3 | Monoglyceryl monoisostearate | 2 | 8 | 6 | 3 | 56000 | 3.7 | 74 |
| Comparative Example 4 | Polyoxyethylene triisostearate hydrogenated castor oil | — | 1 | 7 | 3 | 28000 | 1.9 | 85 |
| Comparative Example 5 | Monoglyceryl monooleate | 2 | 1 | 60< | 12 | 45000 | 3.0 | 81 |
| Comparative Example 6 | Hexaglyceryl diisostearate | 6 | 1 | 22 | 19 | 88000 | 5.9 | 56 |
| Comparative Example 7 | Monoglyceryl tristearate | 0 | 1 | 18 | 10 | 16000 | 1.1 | 78 |

From Table 1, it is understood that the carboxyl-containing polymer compositions obtained by Examples 1 to 6 as the process for producing a carboxyl-containing polymer composition according to the invention become a neutralized viscous liquid which exhibits excellent dispersibility in water (under non-stirring conditions and stirring conditions), is in a viscosity range in which the viscosity thereof is 2.5 times or less the viscosity of the neutralized viscous liquid using the additive-free carboxyl-containing polymer (Comparative Example 1), exhibits a low degree of viscosity increase, and has a high degree of transparency in which the transmittance is 90% or more.

The invention may be embodied in other specific forms without departing from the essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

The invention claimed is:

1. A process for producing a carboxyl-containing polymer composition comprising:
   polymerizing a mixture consisting essentially of an α,β-unsaturated carboxylic acid, an α,β-unsaturated compound excluding the α,β-unsaturated carboxylic acid, a compound having two or more ethylenically unsaturated groups, a polyol isostearic acid ester, and a radical polymerization initiator in a reaction solvent wherein the polyol isostearic acid ester has one to three hydroxyl groups derived from the polyol in the polyol isostearic acid ester molecule, wherein the polyol in the polyol isostearic acid ester is at least one polyol selected from the group consisting of monoglycerin, diglycerin, triglycerin, tetraglycerin, pentaglycerin, hexaglycerin, heptaglycerin, octaglycerin, nonaglycerin, decaglycerin, sorbit, and sorbitan, wherein an amount of the α,β-unsaturated compound excluding the α,β-unsaturated carboxylic acid used is 0.1 to 20 parts by mass based on 100 parts by mass of the α,β-unsaturated carboxylic acid, wherein an amount of the compound having two or more ethylenically unsaturated groups used is 0.01 to 10 parts by mass based on 100 parts by mass of the α,β-unsaturated carboxylic acid, and wherein an amount of the polyol isostearic acid ester used is 0.2 to 7 parts by mass based on 100 parts by mass of the α,β-unsaturated carboxylic acid.

2. The process for producing a carboxyl-containing polymer composition according to claim 1, wherein the polyol (iso)stearic acid ester is at least one selected from the group consisting of monoglyceryl mono(iso)stearate, diglyceryl mono(iso)stearate, monoglyceryl di(iso)stearate, diglyceryl di(iso)stearate, triglyceryl di(iso)stearate, diglyceryl tri(iso)stearate, triglyceryl tri(iso)stearate, tetraglyceryl tri(iso)stearate, triglyceryl tetra(iso)stearate, tetraglyceryl tetra(iso)stearate, and pentaglyceryl tetra(iso)stearate.

3. The process for producing a carboxyl-containing polymer composition according to claim 1, wherein the compound having two or more ethylenically unsaturated groups is at least one selected from the group consisting of pentaerythirol diallyl ether, pentaerythritol triallyl ether, pentaerythritol tetraallyl ether, tetraallyloxyethane, triallyl phosphate, and polyallyl saccharose.

4. A carboxyl-containing polymer composition obtained by the process for producing a carboxyl-containing polymer composition according to claim 1.

5. The carboxyl-containing polymer composition according to claim 4,
wherein the carboxyl-containing polymer composition has a dispersion time under non-stirring of 15 minutes or shorter, and a dispersion time under stirring of 10 minutes or shorter,
wherein a neutralized viscous liquid formed from the carboxyl-containing polymer composition has:
(i) a viscosity equal to or less than 2.5 times a viscosity of a neutralized viscous liquid formed from a carboxyl-containing polymer composition not containing a polyol (iso)stearic acid ester, and
(ii) a transmittance of 90% or more.

6. The process for producing a carboxyl-containing polymer composition according to claim 1,
wherein the α,β-unsaturated carboxylic acid is at least one selected from the group consisting of acrylic acid and methacrylic acid;
wherein the α,β-unsaturated compound excluding the α,β-unsaturated carboxylic acid is at least one selected from the group consisting of stearyl methacrylate, eicosanyl methacrylate, behenyl methacrylate, and tetracosanyl methacrylate; and
wherein the compound having two or more ethylenically unsaturated groups is at least one selected from the group consisting of pentaerythritol diallyl ether, pentaerythritol triallyl ether, pentaerythritol tetraallyl ether, tetraallyloxyethane, triallyl phosphate, and polyallyl saccharose.

* * * * *